US005517463A

United States Patent [19]
Hornbostel et al.

[11] Patent Number: 5,517,463
[45] Date of Patent: May 14, 1996

[54] METHOD OF DETERMINING OPTIMAL SEISMIC MULTISTREAMER SPACING

[75] Inventors: Scott C. Hornbostel, Houston; Stanley V. Morris, Magnolia, both of Tex.

[73] Assignee: Exxon Production Research Company, Houston, Tex.

[21] Appl. No.: 327,120

[22] Filed: Oct. 21, 1994

[51] Int. Cl.$^6$ .................................................. H04B 17/00
[52] U.S. Cl. ............................................................... 367/13
[58] Field of Search .............................. 367/13, 905, 20, 367/56, 22; 364/421

[56] References Cited

U.S. PATENT DOCUMENTS

| | | | |
|---|---|---|---|
| 3,952,281 | 4/1976 | Parrack | 367/20 |
| 3,979,713 | 9/1976 | Parrack | 367/20 |
| 4,068,208 | 1/1978 | Rice, Jr. et al. | 367/19 |
| 4,104,641 | 8/1978 | Unz | 367/905 |
| 4,122,431 | 10/1978 | Peraldi | 367/45 |
| 4,254,480 | 3/1981 | French | 367/58 |
| 4,555,779 | 11/1985 | Roberts | 367/19 |
| 4,635,236 | 1/1987 | Roberts | 367/19 |
| 4,660,185 | 4/1987 | French | 367/19 |
| 4,677,598 | 6/1987 | Johnson | 367/56 |
| 4,709,356 | 11/1987 | Ayers | 367/19 |
| 4,758,998 | 7/1988 | Johnson et al. | 367/58 |
| 4,992,990 | 2/1991 | Langeland et al. | 367/19 |
| 5,111,437 | 5/1992 | Rice | 367/56 |

FOREIGN PATENT DOCUMENTS 2180341  3/1987  United Kingdom .

OTHER PUBLICATIONS

Treitel, S. "The Complex Wiener Filter" *Geophysics*, vol. 39, No. 2, Apr., 1974, pp. 169–173.

Helgaker, P., Nordmoen, B., Brink, M. and Asheim, S. "Marine 3-D Acquisition Using Two Parallel Streamers" Society of Exploration Geophysicists, 56th Annual International Meeting, 1986, Expanded Abstracts, pp. 383–385.

Goldberg, D. E. "Genetic Algorithms in Search, Optimization, and Machine Learning" Addison–Wesley Publishing Company, Inc., U.S.A. and Canada, 1989, pp. 1–23, 27–54 and 126–129.

Duren, R. E. and Morris, S. V. "Sideswipe Removal Via Null Steering" *Geophysics*, vol. 57, No. 12, Dec., 1992, pp. 1623–1632.

*Primary Examiner*—Daniel T. Pihulic
*Attorney, Agent, or Firm*—E. Richard Zamecki

[57] ABSTRACT

Disclosed is a method of determining the optimal spacing of seismic receiver lines, including marine streamers. A weighted squared error function is defined between a desired array response function and an actual response function, and the error function is minimized to determine the values of crossline offsets between streamers as well as the depths of the streamers in a configuration to minimize out-of-plane signal effects, for example.

20 Claims, 10 Drawing Sheets

METHOD OF DETERMINING OPTIMAL SEISMIC MULTISTREAMER SPACING

BACKGROUND OF THE INVENTION

1. Field of the Invention

The present invention pertains to acquisition of seismic data. More particularly, the present invention is related to techniques for acquiring seismic data while minimizing effects due to unwanted out-of-plane energy signals arriving at the receivers, and is especially applicable to marine seismic acquisition. Specifically, the present invention relates to receiver placement in seismic exploration.

2. Description of Prior Art

Seismic exploration is carried out by generating acoustic or elastic waves by one or more sources which direct the wave fronts into the earth's subsurface. Wave fields reflected by subsurface structures, or horizons, are received at the surface by detectors, or receivers, such as geophones. Electrical cables connect the receivers to a monitor which records the electrical signals produced by the receivers in response to the detected acoustic or elastic waves. For seismic exploration conducted through a body of water, the receivers are hydrophones positioned along a cable called a streamer.

Signals from an array of receivers comprising a single line may be utilized to provide information about subsurface structures generally lying along a vertical plane, that is, the selected, or desired, vertical plane defined by the line of the source and the receivers. With such information, a 2-D vertical, seismic section of the subsurface may be produced, in pictorial form, for example. A receiver and source arrangement comprising a multiplicity of generally parallel, and relatively closely-spaced lines of receivers and sources provides data which may be utilized to produce a 3-D representation of subsurface structures. In general, multiple parallel lines of sources and receivers are used for data acquisition. In marine seismic acquisition, multiple parallel streamers may be towed by a single boat that traverses multiple parallel paths to comprise the total 3-D survey.

In 2-D marine seismic acquisition there is frequently a problem with energy from out of the selected plane arriving at the receivers along with the in-plane energy. The out-of-plane energy reduces the accuracy and reliability of the accumulated data as representing the underground structures. An additional problem, unrelated to the out-of-plane energy, is that the signal bandwidth is reduced because of ghosting related to the depth of the marine receivers as signals are reflected from the water surface to the receivers.

A currently available technique for dealing with the out-of-plane noise problem involves the use of multiple, parallel streamers. Data from the streamers are added in the crossline sense to attenuate the out-of-plane arrivals. However, the spacing of the streamers is not optimized, but is more determined by rules of thumb. Since the streamer spacing affects the crossline attenuation, that attenuation is not maximized. Further, the streamer depth, which is generally held constant for all streamers, produces bandwidth loss due to ghosting.

Some of these effects may be further appreciated by reference to FIG. 1 which shows a computer model simulation of the amplitude response of the crossline addition of the output of four receivers in four parallel streamers fifty meters apart and at a constant depth of nine meters. The amplitude of the summed received signals, indicated in decibels according to the color scale presented at the left of the drawing, is plotted as a function of frequency from zero Hz to 125 Hz along the ordinate, and of crossline dip from −90° to +90° along the abscissa. The in-plane data is along the 0° ordinate. The parameters on which the frequency spectrum of FIG. 1 is based are fairly typical for a four-streamer array, and it is instructive to observe several features of the amplitude response.

First, at low frequencies the receiver array passes most energy regardless of dip as indicated by the broad dip angle band A. Second, at high frequencies signals for a relatively narrow range of dip are passed, that is, signals are passed only for in-plane arrivals, or for nearly in-plane arrivals within the band B. Third, for certain combinations of frequency and dip the arrivals are passed unattenuated because the out-of-plane arrivals are aliasing as in-plane arrivals. These signals combine in-phase to produce the high amplitude, curved lobes C, for example. Fourth, the amplitudes are not uniform, but rather exhibit peaks and nulls related to the ghosting. h-plane peaks D are centered at 42 Hz and at 125 Hz, and in-plane nulls appear at 0 Hz and at 83 Hz, indicated at E. Fifth, ghosting causes phase distortion which fluctuates back and forth between +90° and −90° as may be appreciated by reference to FIG. 2 wherein is shown the phase response for the array whose amplitude spectrum is illustrated in FIG. 1. As shown in FIG. 2, abrupt 180° phase changes appear with changing frequency and dip at various locations throughout the phase spectrum. The parabolic ghosting notch, which produces the in-plane null E in FIG. 1, is evident in both FIGS. 1 and 2.

Any of the aforementioned five features of crossline summation may present a serious problem to data acquisition depending on the frequencies of interest and the nature of the crossline noise.

Another technique currently available for dealing with out-of-plane arrivals involves collecting 3-D data and using migration to move the out-of-plane energy to its proper plane. While this is an effective approach it has the disadvantage of greatly increased expense.

Another approach to out-of-plane energy problems addresses the loss of signal which is slightly out-of-plane, especially at high frequencies, as noted above. In this technique signals are scanned over a selected, relatively small range of acceptable angles. As a result signal strength can be improved, particularly at high frequencies where signals are normally attenuated due to the sharpness of the array response. However, this technique requires signals that are strong enough to be detected, and only one at a time can be handled. Also, this technique does not optimize to reduce coherent noises.

Crossline summation of multistreamer receivers can, in general, attenuate out-of-plane energy and also attenuate random noise. It would be advantageous and desirable to provide a technique for utilizing crossline summation in a manner to avoid the aforementioned shortcomings of that approach. The present invention provides such a method wherein the spacing of multiple streamers, for example, is optimized to avoid or minimize these drawbacks.

SUMMARY OF THE INVENTION

The present invention provides a method of determining the optimal spacing of fines of seismic receivers in an array. A desired array response function is specified for the array, and a weighting function is also specified. A weighted squared error function is defined based on the difference between the desired array response function and an actual array response function. Thereafter, the error function is minimized to obtain the optimal spacing parameter values, such as the crossfine offsets between generally parallel receiver lines and, in the case of seismic marine streamers, the depths of the individual streamers. In one form of the invention, the array elements are optimally filtered before summation to minimize the error function for a given set of streamer spacings. These optimal filters are determined by a normal equation approach.

The minimization of the error function with respect to spacing may be carded out by utilizing a genetic algorithm. As an option the outcome of the error function minimization may be refined by use of a steepest-descent local minimization.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF PREFERRED EMBODIMENTS

Figure 3:
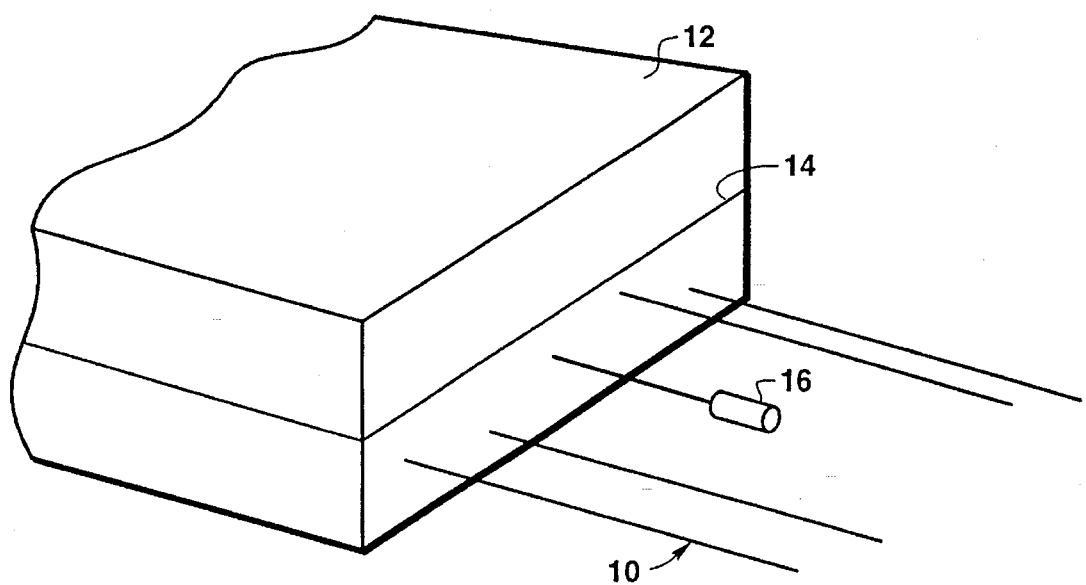
FIG. 3 is a schematic illustration depicting four seismic streamers, spaced for towing at different depths behind a boat.

The present invention may be used to optimize the positioning of seismic receivers, including marine seismic streamers. FIG. 3 illustrates an array of four marine seismic streamers, shown generally at 10, being towed behind a boat 12. The streamers 10 are all horizontal and mutually parallel, being also generally perpendicular to the back of the boat 12, but are located at different depths below the water surface which is indicated by the waterline 14 on the boat. Four streamers 10 are shown and discussed for purposes of illustration only; any number of streamers may be mutually spaced according to the present invention. Each streamer 10 includes a plurality of hydrophones (not shown) for detecting seismic waves reflected back from beneath the seabed (not shown). A single source for generating seismic waves for transmission to the subsea surface may be located at some selected point relative to the streamer array 10, or multiple sources may be arranged along the array. For example, a source 16 may be positioned between the streamers 10 and the boat 12, generally centered on the array in the crossline direction.

In general, the spacing of multiple streamers may be described in a variety of ways, but comprises the relative depths of the streamers as well as the crossline distance between streamers, that is, the horizontal distance measured perpendicularly to the direction of orientation of the streamers and between the vertical planes in which the streamers are positioned. Thus, the spacing of the streamers may be identified by their respective depths and their respective crossline offsets, with the latter term measured relative to a selected streamer or relative to a specified line parallel to the streamers, for example.

Figure 4:
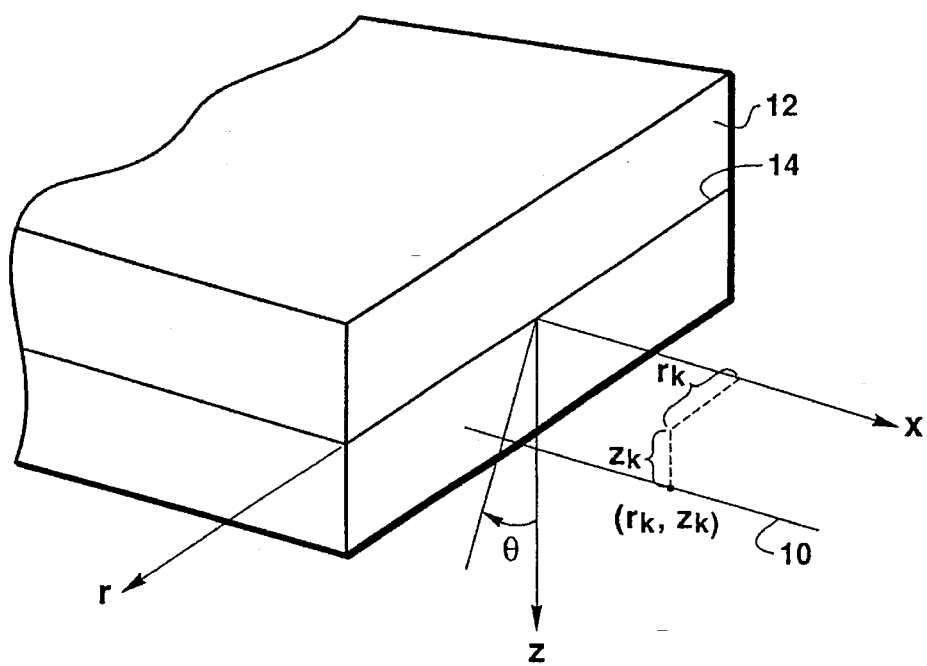
FIG. 4 is a view similar to FIG. 3, illustrating an orthogonal coordinate system rzx centered on the back of the boat at the waterline for use in locating the offset of a streamer from the center of the streamer array along the r axis and the depth of the streamer along the z axis.

FIG. 4 includes an orthogonal coordinate system rzx centered on the back of the boat 12 at the waterline 14, and shows one streamer 10, the kth streamer of an array of any number of streamers, positioned behind the boat at a depth $z_k$ and located a distance $r_k$ from the center of the array, that is, from the vertical zx plane which is centered on the boat. Any streamer in the array 10 of FIG. 3 can be located in the array by its depth and distance from the central zx plane, that is, by the location (r,z) of any point along the streamer, or the streamer's intersection with the rz plane. The vertical zx plane, to which the streamers 10 are parallel, is the selected, or desired, plane along which a seismic survey is to be taken. The crossfine angle, or dip, is the polar coordinate θ, shown in the rz plane, with values ranging from +90° along the r axis to −90° along the −r axis. The present invention provides the optimal values of depth z and horizontal location, or offset, r for each streamer in an array to accommodate the prevailing conditions under which the seismic survey is being conducted.

Figure 5:
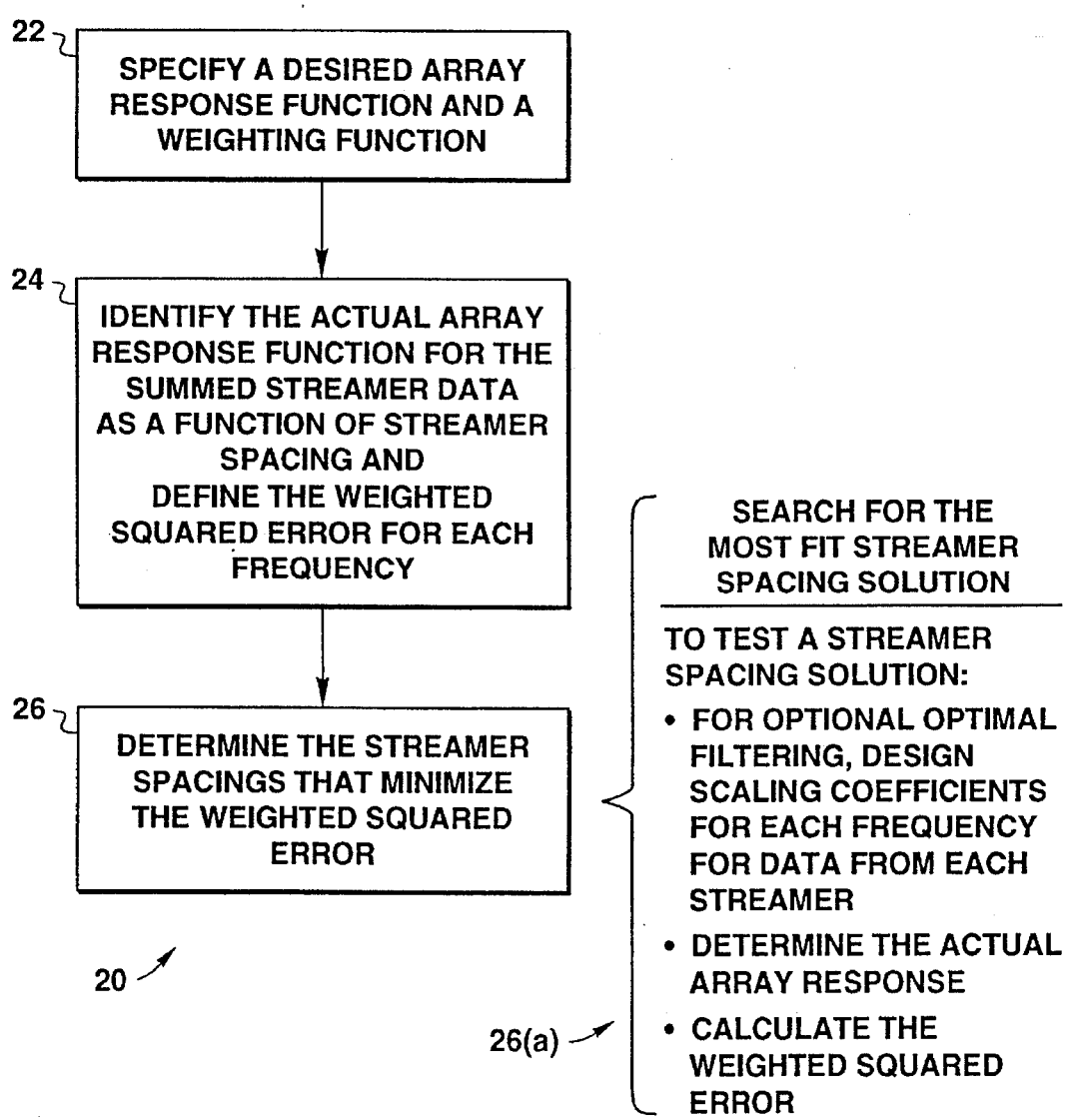
FIG. 5 shows a flow diagram depicting steps of a method for optimizing seismic multistreamer spacing according to the present invention.

FIG. 5 presents a flow diagram generally at 20 showing the general steps by which a seismic streamer array may be optimally spaced according to the present invention. As indicated at 22 of the flow diagram 20, the present invention may be implemented by specifying a desired, chosen or selected crossline array response function G(θ, f) where θ is the crossfine angle, as discussed above in connection with FIG. 4 for example, and f is the frequency of the seismic signal. A weighting function W(θ, f) is specified to indicate, as a function of crossfine arrival angle and frequency, the relative importance of matching the actual array response to the desired array response. Generally, highest weights will be used for in-fine or nearly in-line angles and frequencies in the seismic passband (e.g., approximately 5–80 Hz). The actual array response for the summed streamer data is identified as a function of streamer spacing at 24, as further described below, and a weighted squared error is defined for each frequency. The weighted squared error compares the actual array response function with the desired array response function. The quality, or fitness, of a given streamer spacing solution is thus measured precisely by comparison with the desired ideal response, using the weighted squared error defined at 24 for each frequency. The streamer offset and depth values are obtained which optimize the solution quality, that is, which minimize the weighted squared error, at 26. The optimization can be carded out by any appropriate search technique, as indicated generally at 26(*a*). To test a given streamer spacing solution, the actual array response is determined for the specific offset and depth values, and the weighted squared error is calculated. The relative size of the resulting error is a measure of the fitness of the streamer spacing solution comprising the specified offset and depth values.

In a preferred form of the invention the general, complex weighted squared error, or misfit, function may be defined as $$E = \sum_\theta \sum_f W(\theta,f) \|H(\theta,f) - G(\theta,f)\|^2 \quad (1)$$

where $W(\theta,f)$ is the weighting function and $G(\theta,f)$ is the desired array response function as noted above, and $H(\theta,f)$ is the actual array response function. The weighted squared error E is to be minimized with respect to the streamer spacings, that is, the streamer offsets and depths. The complex form of the weighted squared error is used when both phase and amplitude functions are to be compared. Alternatively, for the case wherein amplitude response is the important factor and phase problems can be ignored, the only error to be minimized is based on the amplitude response and the weighted squared error may be defined as $$E = \sum_\theta \sum_f W(\theta,f)[\|H(\theta,f)\| - \|G(\theta,f)\|]^2. \quad (2)$$

A generally preferred option available as part of the present invention includes the use of optimal filtering, as indicated at 26(*a*) in the flow diagram 20. The actual array response $H(\theta, f)$ included in the weighted squared error defined at 24 is a crossline sum of the filtered outputs of the receivers. In this process the filters applied to the separate receiver outputs comprise complex optimal coefficients $C_k(f)$ determined at 26(*a*) by using a normal-equation approach, for example. To obtain the normal equations the complex weighted squared error is defined at each frequency f using $$E(f) = \sum_\theta W(\theta,f)\|H(\theta,f) - G(\theta,f)\|^2 + \lambda \sum_{k=1}^{N} \|C_k(f)\|^2 \quad (3)$$

where the first summation is made over the crossline angles of interest and the latter term is included to penalize large filter coefficients for the N streamers to stabilize the optimization, with $\lambda$ being a stabilization factor, as would be well known to persons skilled in the art. The actual array response $H(\theta, f)$ in Equation (3) is given by $$H(\theta,f) = \sum_{k=1}^{N} C_k(f) e^{-i2\pi f r_k \sin\theta/V}[e^{+i2\pi f z_k \cos\theta/V} - e^{-i2\pi f z_k \cos\theta/V}] \quad (4)$$

where V is the velocity of sound in water, $r_k$ is the crossline distance (offset) of the kth streamer from the central vertical plane in the array, and $z_k$ is the depth of the kth streamer. For each streamer k, Equation (4) includes a delay, or timing, factor dependent on the streamer offset $r_k$, and a delay, or timing, factor dependent on the streamer depth $z_k$, with each such factor dependent as well on the crossline angle of signal arrival $\theta$ and the seismic signal frequency f. The partial derivatives of Equation (3) are taken with respect to the real and imaginary parts of the filter coefficients $C_k(f)$ for each streamer k and set equal to zero to obtain the 2N normal equations in 2N unknowns, the values of the coefficients for the given frequency. The equations are solved to give the optimal filter coefficients at each frequency for the specified offsets and depths. With the filter coefficients thus evaluated for a specified set of offset and depth values, the actual array response can be calculated using Equation (4), and the weighted squared error can be determined using Equation (1) or Equation (2) to test the fitness of the streamer spacing solution.

An optimization method such as a genetic algorithm may be used to perform this minimization at 26 and 26(*a*), for example. The use of genetic algorithms as a search and optimization technique is known, and need not be discussed in detail herein. Genetic algorithms are discussed at length in "Genetic Algorithms in Search, Optimization, and Machine Learning", by David E. Goldberg, Addison-Wesley Publishing Company, Inc., U.S.A., (1989). Some features of genetic algorithms of particular interest in connection with the present invention are noted below, however. Further, a flow diagram for the use of a genetic algorithm to minimize a weighted squared error, as called for at 26 and 26(*a*) of the flow diagram 20 of FIG. 5, is illustrated generally at 50 in FIG. 6.

In carrying out a genetic algorithm, the parameters whose values are sought are coded in strings of binary bits so that a particular set of 1s and 0s would represent a particular solution. In the present case, a solution comprises a particular set of values of streamer depths and offsets, and is to be substituted in the weighted squared error equation obtained at 52. A random collection of M such strings, constituting the first generation solutions, is constructed at 54, and the solutions are evaluated to measure their fitness at 56, using, in the present case, Equation (1) or Equation (2) as appropriate, with or without optimal filtering as desired. As is well known to persons skilled in the art, the choice of the specific number M of solutions picked at 54 (twenty-five, for example), as well as the numbers of solutions and of pairs of solutions utilized at other steps in the algorithm, and of the number of iterations employed, are all arbitrary, and are adjusted as desired based on the particular application of the genetic algorithm. Pairs of solutions (M are indicated) are selected at 58 with the more fit solutions being more likely to be selected. Thus, a more fit solution may be paired with other solutions more than once, while the least fit solution may not be paired at all. The selected paired solutions are combined to form offspring at 60, that is, next generation solutions, by randomly exchanging binary bits between the two parents in a given pair. Also, mutations of a small number of coded solutions may be randomly carded out at 62 by randomly converting one or more of the binary bits of a solution in such a case.

The new generation offspring solutions are evaluated for fitness at 64. A selected number of the most-nearly redundant solutions from among the new generation of offspring solutions and the previous generation of parent solutions may be discarded at 66. The remaining offspring solutions and solutions from the parent generation form a pool of solutions that may be evaluated according to their fitness. A selected number of the solutions in the pool (M are indicated) are retained at 68, based upon their relative fitness. This process of generating and testing proposed solutions, and selecting the more fit solutions, is repeated a specified number of times (J-1 iterations are used to obtain the Jth generation as specified), as indicated at 70. For each iteration of the process, the solutions retained at 68 are paired based on fitness at 58 to form parents of the next generation of offspring at 60, and the process continued as discussed above. After the specified iterations of the process have been performed, the solutions of the final set retained at 68 are evaluated, and the most fit solution from the group of retained solutions is chosen at 72 as the solution that minimizes the error function, here, the weighted squared error of Equation (1) or Equation (2), for example. Generally, the solutions constructed and selected in this iterative process converge to the optimal solution to minimize the weighted squared error. In the present application, the process yields the optimal spacing, in terms of offsets and depth values, of the seismic streamers in the array. As an option, the solution selected at 72 may be refined by the steepest descent method at 74 wherein the local gradient of the error function may be evaluated as the solution values are varied, as is well known to persons skilled in the art.

The following examples further illustrate the use of the present invention. Consider in each case that an array of four streamers is to be towed in parallel behind a boat as indicated in FIGS. 3 and 4, and that the optimal spacing, that is, the optimal offsets and depths, for the four streamers is to be determined. Thus, the present invention is to be employed to minimize undesired out-of-plane effects, that is, to attenuate signals received at other than desired dip values, or crossline angles.

A desired array response is identified. Consider that it is desired to pass arrivals that are nearly in-plane while removing all signals at larger crossline angles, and consider that a strong undesired noise is expected between $+16°$ and $+24°$ crossline angles. Consequently, the pass band is chosen to be asymmetric. The desired array response function $G(\theta, f)$ is defined as $$G(\theta, f) = 1, \quad -10° \leq \theta \leq +6°; \qquad (5)$$
$$= 0, \quad \text{otherwise}.$$

Figure 7:
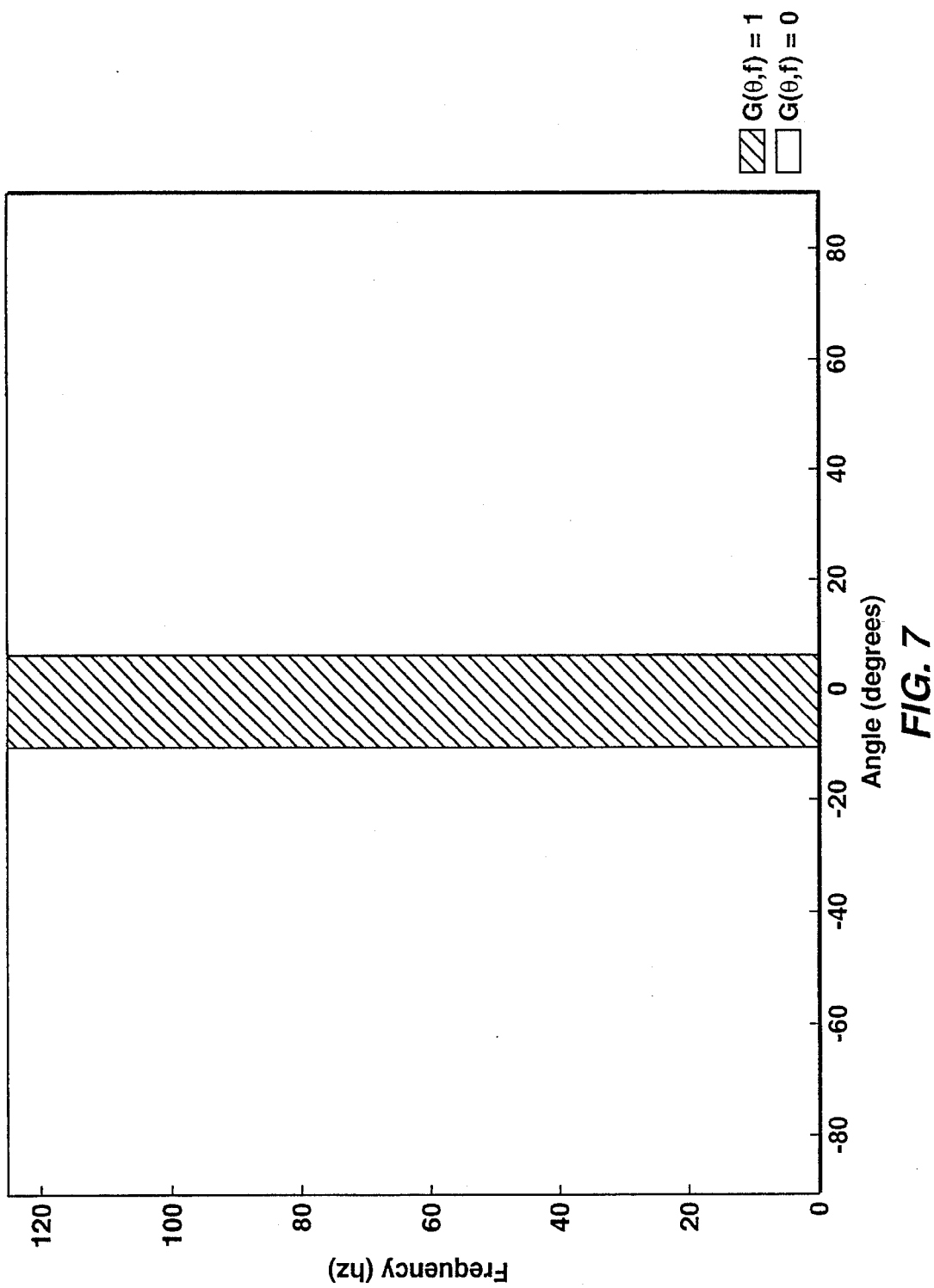
FIG. 7 is an example of a desired multireceiver array response.

The desired array response of Equation (5) is illustrated in FIG. 7. Although $G(\theta, f)$ is actually a complex function the desired phase is assumed to be zero for this example.

A weighting function $W(\theta, f)$ is specified to indicate how important it is to match the desired array response as a function of dip and frequency. For this example it is assumed that $W(\theta, f)$ is a separable function $$W(\theta, f) = W_1(\theta) W_2(f) \qquad (6)$$

where $$\begin{aligned}
W_1(\theta) &= 0.1, \quad -90° \leq \theta < -10°; \\
&= 1.0, \quad -10° \leq \theta < -2°; \\
&= 5.0, \quad -2° \leq \theta \leq +2°; \\
&= 1.0, \quad +2° < \theta \leq +6°; \\
&= 0.1, \quad +6° < \theta \leq +16°; \\
&= 3.0, \quad +16° < \theta \leq +24°; \\
&= 0.1, \quad +24° < \theta \leq +90°; \\
\text{and} & \\
W_2(f) &= 1.0, \quad 5 \text{ Hz} \leq f \leq 80 \text{ Hz}; \\
&= 0.1, \quad \text{otherwise}.
\end{aligned}$$

Figure 8:
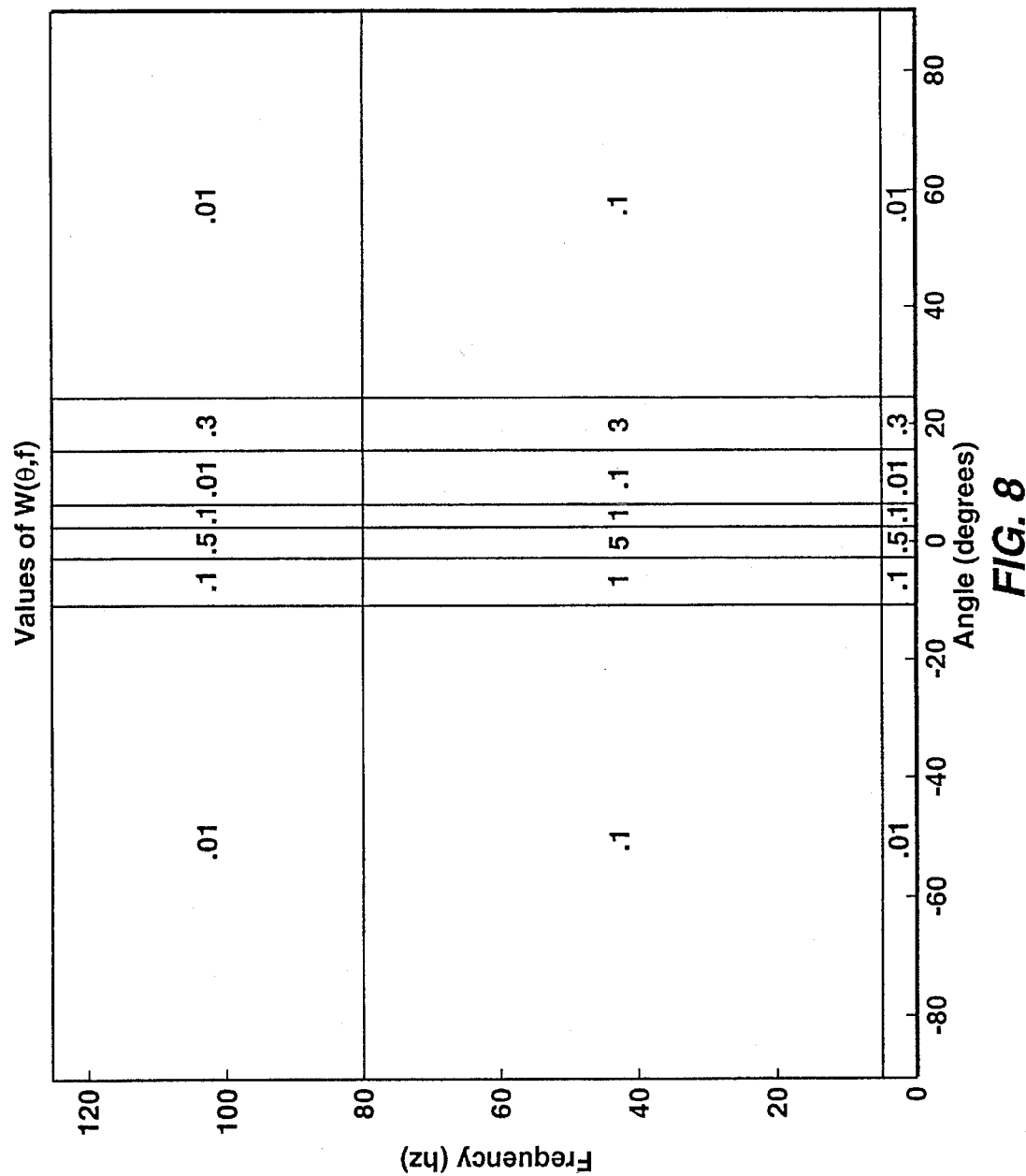
FIG. 8 is an example of a weighting function for use in the present invention.

The weighting function of Equation (6) is illustrated in FIG. 8. With this weighting function the expected signal frequencies in the range from 5 to 80 Hz are most important. Also, more emphasis is placed on fitting both the dip passband, particularly at normal, or in-plane, incidence, using a weighting function value of 5.0 for $W_1(\theta)$, and the dip range from $+16°$ to $+24°$ where strong noises are expected, as indicated above, using a value of 3.0 for $W_1(\theta)$. These high weighting function values indicate the relative importance of matching the actual array response to the desired array response for these ranges of crossline angles.

Figure 1:
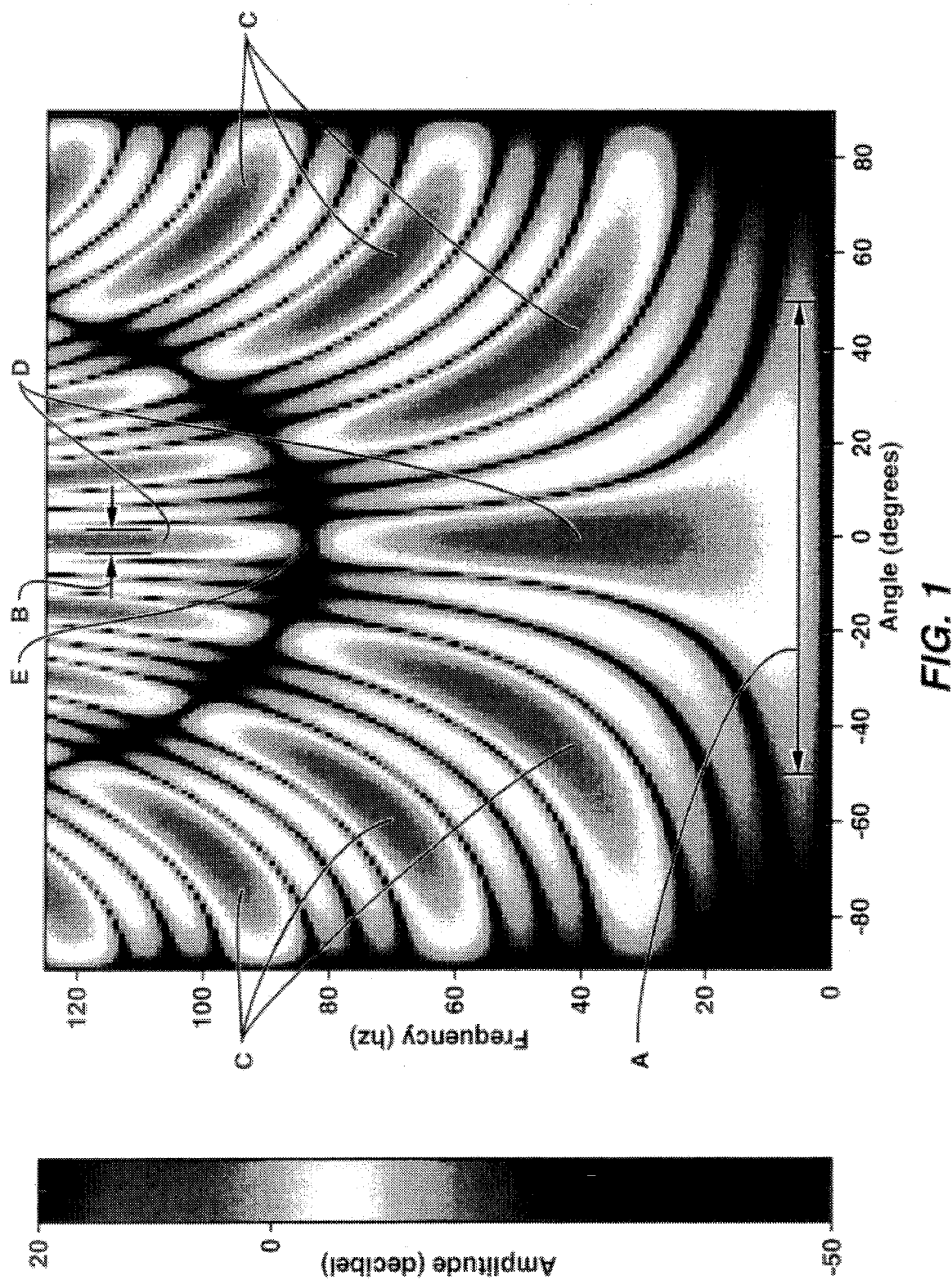
FIG. 1 is a color computer model simulation of the amplitude response of the crossline addition of the output of four receivers without the use of the present invention, plotted as a function of frequency and of crossline dip, and including a color scale representing values of amplitude in decibels.
Figure 2:
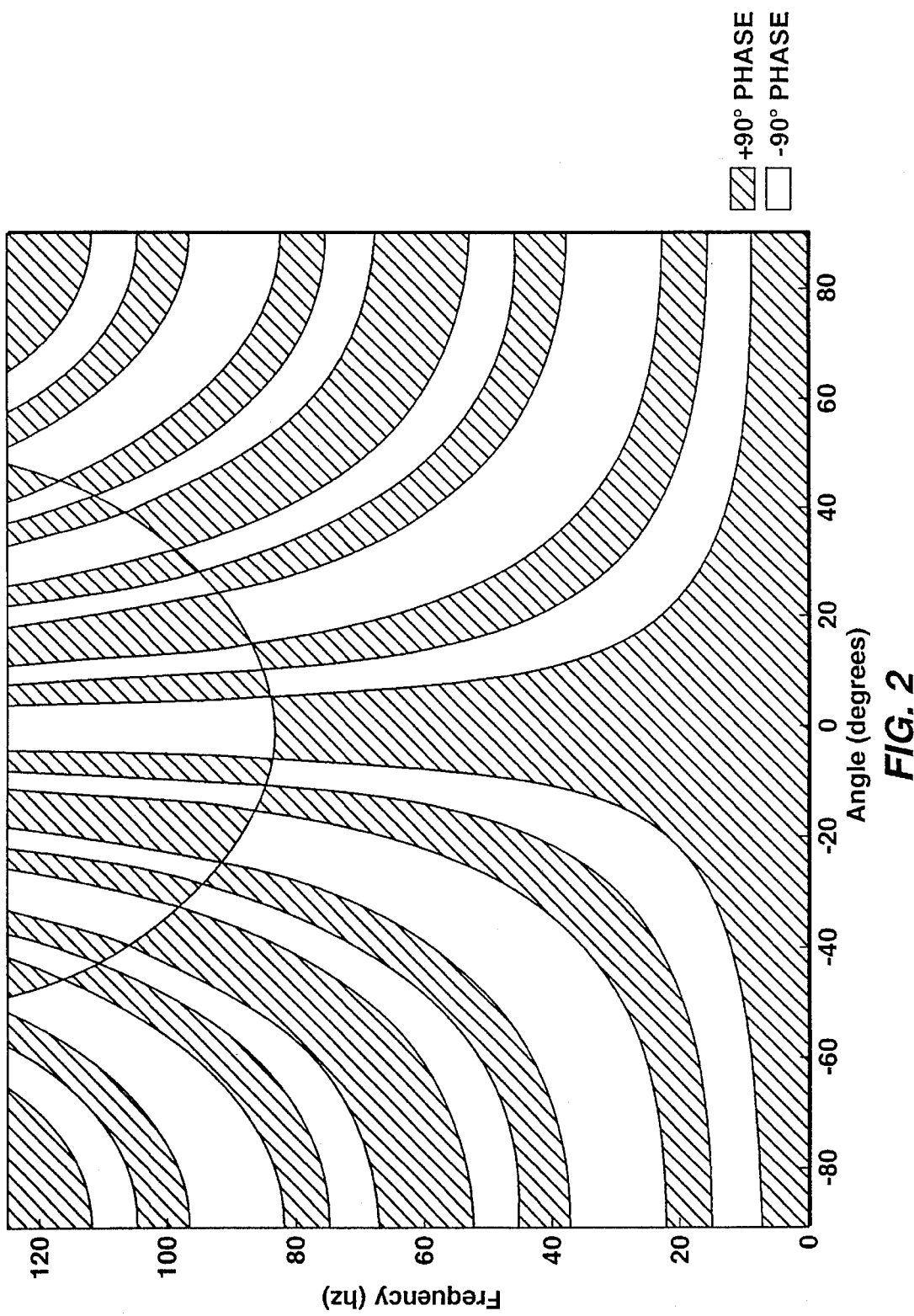
FIG. 2 is a plot of the phase response as a function of frequency and of crossline dip of the addition of signals whose amplitude spectrum is shown in FIG. 1.

One of several approaches can now be taken to determine the optimal streamer spacing. In one approach the four crossline element outputs are simply summed and divided by four to get the actual array response. FIGS. 1 and 2 illustrate the amplitude and phase responses for a simple summation of four receiver elements without the use of the present invention. For this four streamer case, the actual array response is given by Equation (4) where N=4 and each of the four filter coefficients $C_k(f)$ is set equal to 0.25. For this example, the error to be minimized is based only on the amplitude response and is given by Equation (2). The range of possible offsets $r_k$ and depths $Z_k$ can now be searched and evaluated using Equation (2) to find the offsets and depths that provide the best weighted fit to the desired response.

This example was carried out using a genetic algorithm to perform the optimization. Equation (2) provides the weighted squared error called for in step 52 of the process 50. In forming the solutions used in the genetic algorithm the three crossline distances between adjacent streamers and the four individual depths were considered using ten bits each for a total of seventy bits. The streamer depths were allowed to range between two meters and forty meters, and the spacings between adjacent streamers were constrained to be greater than twenty-five meters with a total streamer crossline spread less than three hundred meters. These depth and spacing limitations are comparable to the practical limits for such parameters.

Figure 6:
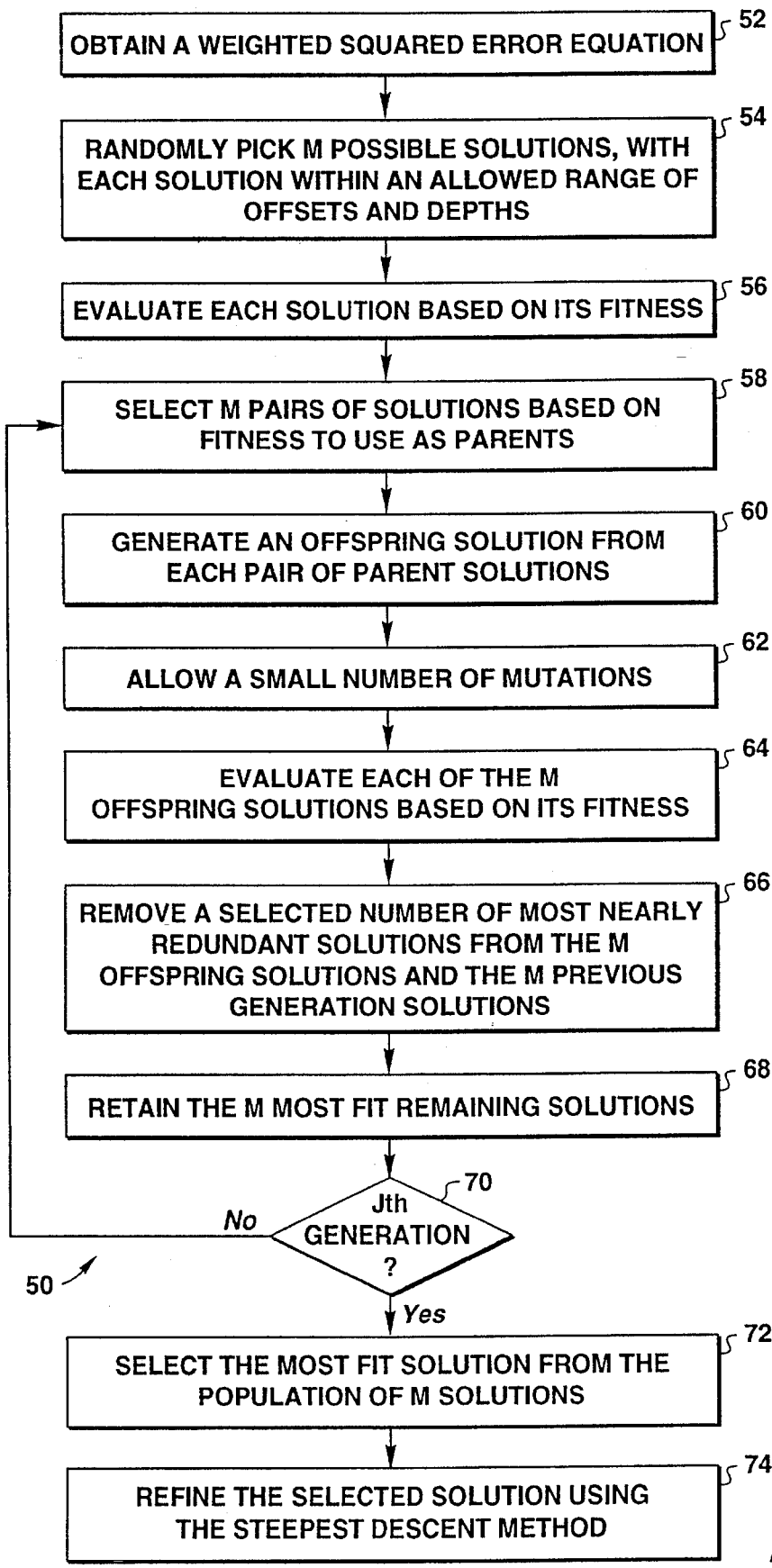
FIG. 6 shows a flow diagram for steps of a method of minimizing error utilizing a genetic algorithm for use in the present invention.

The iterative process of obtaining selected members of a population of solutions and forming a new generation of solutions according to the process 50 of FIG. 6 was carried out thirty (J) times, with each solution comprising a seventy-bit string. An initial population of twenty-five (M) solutions was randomly constructed at step 54, and tested for fitness, using Equation (2), at 56. The solutions were evaluated for fitness. Twenty-five (M) sets of parents were randomly formed at 58 with the more fit individuals being more likely to be selected as parents, and twenty-five offspring were formed at 60 by randomly picking bits with equal probability from each of the parents in a pair. The offspring were allowed to mutate by converting any given bit with probability of 0.005 at 62. The twenty-five offspring solutions of the new generation were then evaluated for fitness at 64. The three most-nearly redundant solutions, that is the three solutions most similar in total spacing to a higher-ranked solution, were eliminated from the pool of parent solutions and offspring solutions at 66, after which the most fit twenty-five (M) solutions were selected from the pool at 68.

Figure 9:
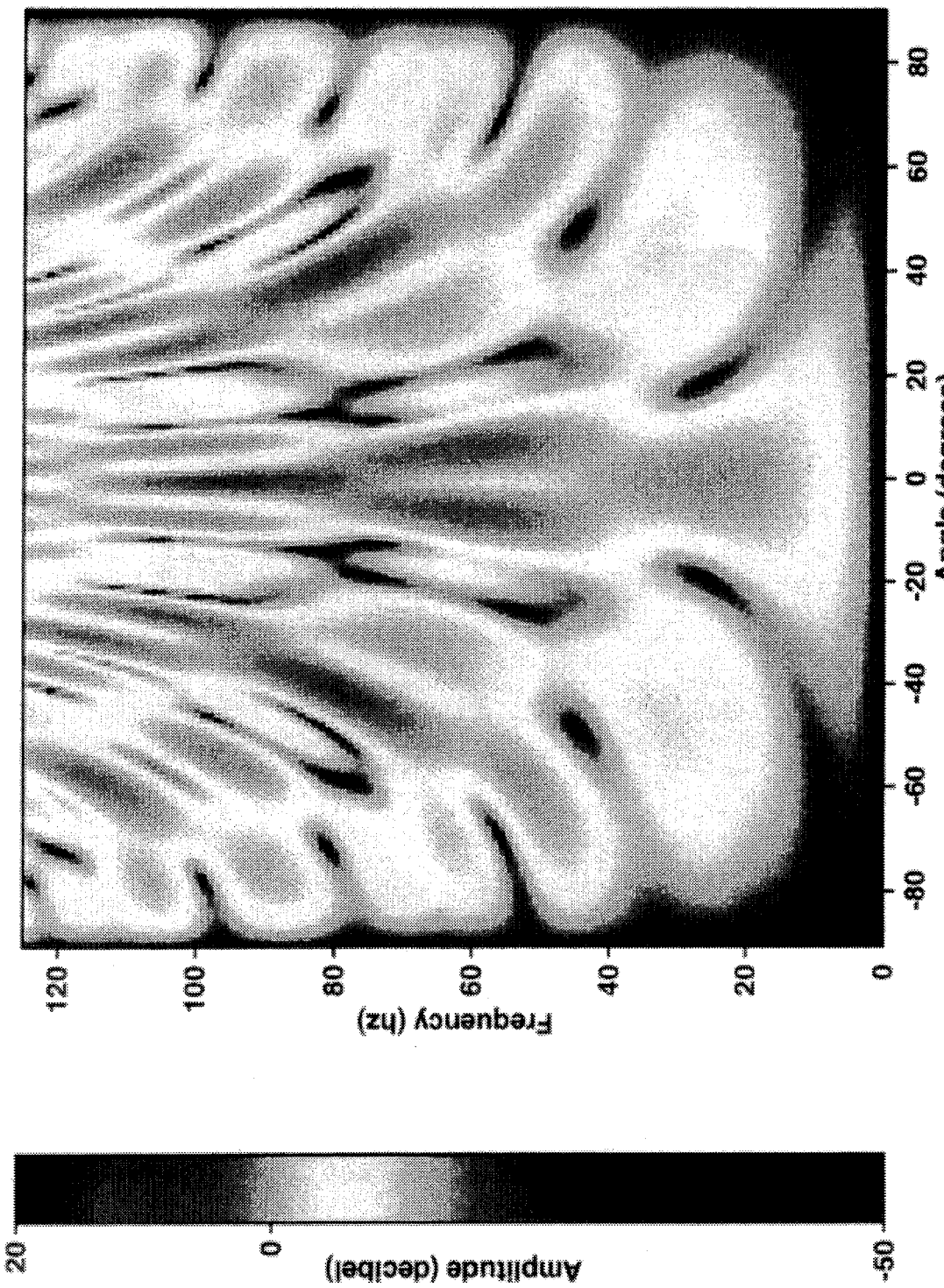
FIG. 9 is a color computer model simulation of the amplitude response of the crossline addition of four receivers for the case of the desired array response of FIG. 7 and the weighting function of FIG. 8, utilizing the optimal spacing technique of the present invention, and including a color scale representing values of amplitude in decibels.

The twenty-five solutions obtained at step 68 formed the latest generation of solutions to start the process again at step 58 with the random selection of twenty-five (M) sets of parents. The process was repeated from step 58 through step 68 so that a total of thirty (J) generations had been obtained, with each new generation constructed using the benefits obtained by the random selection and best-fit evaluations used to process all previous generations. After the thirty generations the best solution selected for Equation (2) at step 72 had a weighted error of 831 compared to a weighted error of 2,010 in the non-optimized case illustrated in FIGS. 1 and 2. A steepest-descent refinement was performed at step 79 to find the local minimum of the weighted squared error of Equation (2), thus reducing the optimized error to 784. The optimal offsets were determined to be −63.7, −37.9, −5.5 and +63.7 meters from one side of the array to the other, with streamer depths of 2.00, 3.87, 7.05 and 19.02 meters, respectively. The corresponding amplitude response is shown in FIG. 9, and represents the optimal match of the desired response Equation (5) for the given weighting function Equation (6) when the outputs of the streamer elements are simply summed in the crossline direction.

Figure 10:
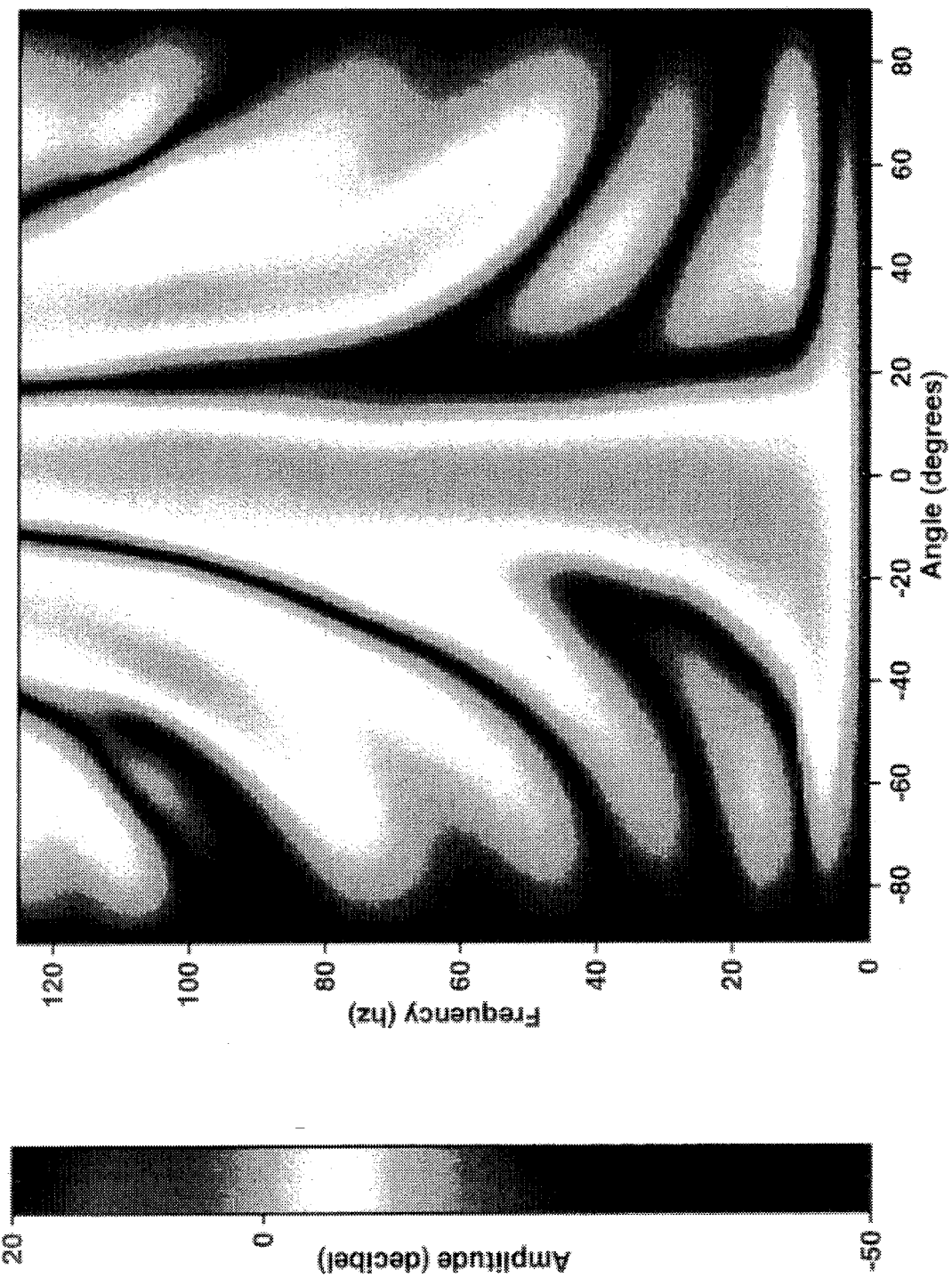
FIG. 10 is a color computer model simulation similar to that shown in FIG. 9 and for the same case, but further employing optimal filtering before the summation to determine optimal spacing according to the present invention, and including a color scale representing values of amplitude in decibels.
Figure 11:
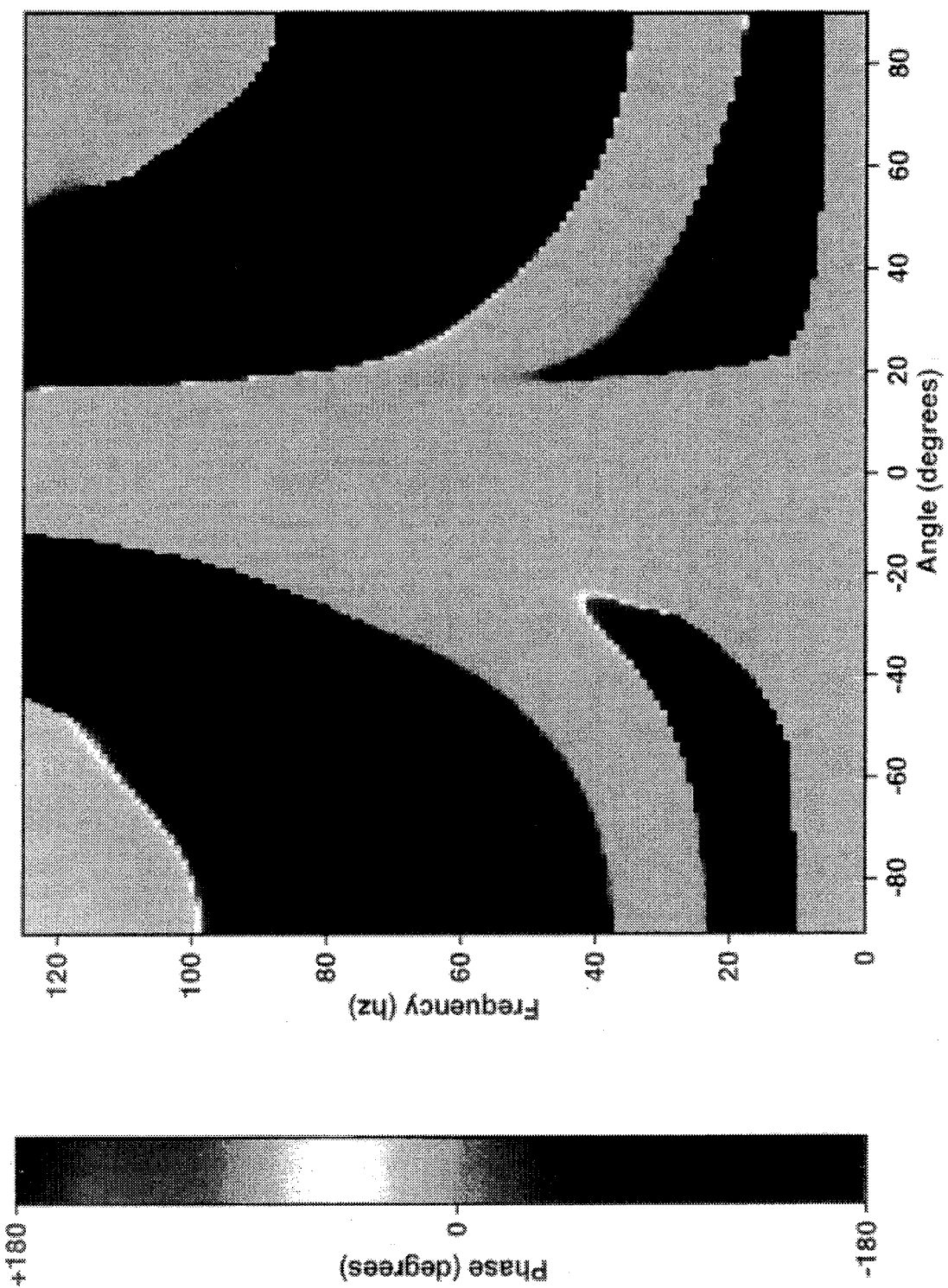
FIG. 11 is a color computer model simulation of the phase response of the amplitude spectrum shown in FIG. 10 plotted as a function of the frequency and of the crossline dip, and including a color scale representing values of phase in degrees.

As a second example the first example was effectively repeated to find the optimal offsets and depths for the four streamers in an array with the same desired array response and the same weighting function as given above at Equations (5) and (6), respectively, but utilizing Equation (3) as the weighted squared error in the step of optimal filtering of the data before summation. The minimization of the weighted squared error was carried out using a genetic algorithm according to the flow diagram 50 in FIG. 6, and using the same limitations on the streamer depths and on the offsets, and the same values for M and J, as utilized in the first example. Thus, to evaluate the fitness of each solution at steps 56 and 64 the partial derivative of the error function of Equation (3) was set equal to zero at each frequency for each streamer to obtain the optimal filter coefficients for each frequency for the proposed solution as discussed above in connection with 26(a) of the process 20 of FIG. 5. After the genetic optimization of diagram 50 in FIG. 6 the error was 258, which was reduced to 256 by the steepest-descent refinement of step 74. The optimal offsets were determined to be −50.7, −12.4, +12.6 and +50.7 meters with depths of 6.77, 2.00, 2.00 and 6.77 meters, respectively. The amplitude and phase responses for this example are shown in FIGS. 10 and 11, respectively. A comparison of FIGS. 9 and 10 demonstrates that the optimal filtering provided a better fit than the unfiltered case. Further, the optimization process of the present invention including optimal filtering completely removed the ghosting null and provided an amplitude response that is essentially flat with frequency, and introduced no phase distortion to the arriving signal, as is evident from the plot of FIG. 11.

The present invention provides an effective method for optimally spacing marine seismic streamers, both regarding offsets and depths, and is applicable to arrays of any number of streamers. The invention may also be applied to the optimization of spacing of seismic land cables. As demonstrated by the above examples, the present invention may provide an array spacing that results in a flat amplitude/frequency response along the desired arrival plane with no phase distortion introduced to the arriving signals. Although the use of genetic algorithms to minimize the error functions is demonstrated herein, any other appropriate search method may be utilized to carry out the minimization of a weighted squared error according to the present invention. In addition to its effectiveness the present invention has the advantage of being able to be carded out relatively inexpensively, particularly compared to the use of migration to move out-of-plane arrivals as noted above.

The foregoing disclosure and description of the invention is illustrative and explanatory thereof, and various changes in the method steps may be made within the scope of the appended claims without departing from the spirit of the invention.

What is claimed is:

1. A method of determining the optimal geometry of an array of at least two lines of seismic receivers, comprising the following steps:

a. specifying a selected array response function and a weighting function;

b. defining a weighted squared error function between the selected array response function and an actual array response function; and c. minimizing the weighted squared error function to determine the geometry of the array.

2. A method as defined in claim 1 wherein the array of lines of receivers are arranged generally parallel and the geometry of the array comprises the crossline offsets between lines.

3. A method as defined in claim 1 wherein the array of lines of receivers comprises at least two marine seismic streamers arranged generally parallel and the geometry of the array comprises the crossline offsets between the streamers and the depths of the streamers.

4. A method as defined in claim 1 wherein the actual array response function is a crossline sum of receiver outputs.

5. A method as defined in claim 4 wherein each of the outputs is optimally filtered prior to summation, with the filters determined by a normal equation approach.

6. A method as defined in claim 1 wherein:

a. the selected array response function is so specified as a function of the crossline arrival angle of the seismic signals at the lines of receivers and of the seismic signal frequency; and b. the weighting function is so specified as a function of the crossline arrival angle of the seismic signals at the lines of receivers and of the seismic signal frequency.

7. A method as defined in claim 6 wherein the actual array response function is a function of the crossline arrival angle of the seismic signals at the lines of receivers, the seismic signal frequency, and the geometry of the array of lines of seismic receivers.

8. A method as defined in claim 1 wherein the minimization of the weighted squared error is carded out using a genetic algorithm optimization.

9. A method as defined in claim 8 further comprising the step of carrying out a steepest-descent local minimization of the genetic algorithm optimization of the weighted squared error.

10. A method as defined in claim 8 wherein the genetic optimization algorithm comprises the steps of:

d. selecting a plurality of possible solutions for the actual array response function;

e. evaluating the fitness of the solutions for minimizing the weighted squared error function;

f. randomly forming a plurality of pairs of solutions based on their fitness;

g. generating an offspring solution from each pair of solutions; and h. evaluating the fitness of the offspring solutions for minimizing the weighted squared error function.

11. A method as defined in claim 10 further comprising the step of selecting the most fit solution from the remaining offspring solutions and the remaining solutions used to form the pairs.

12. A method as defined in claim 11 further comprising the following steps:

i. before selecting the most fit solution in claim 11, selecting a plurality of the most fit solutions from the remaining offspring solutions and the remaining solutions that were used to form the pairs; and j. repeating steps f. through h. above.

13. A method as defined in claim 12 further comprising repeating steps i. and j. a selected number of times.

14. A method as defined in claim 12 further comprising the step of removing a number of the most nearly redundant solutions before performing step i.

15. A method as defined in claim 11 further comprising the step of allowing a number of mutations of the offspring solutions before performing step h. and selecting the most fit solution in claim 11.

16. A method of determining the optimal relative spacing of multiple marine seismic streamers in an array, comprising the following steps:

a. specifying a selected array response function as a function of the crossline angle of arrival of seismic signals at the array of streamers and of the seismic signal frequency;
   b. specifying a weighting function as a function of the crossline angle of arrival of seismic signals at the array of streamers and of the seismic signal frequency;
   c. identifying the actual array response function for summed data from the streamers;
   d. defining a weighted squared error function between the selected array response function and the actual array response function; and
   e. determining the streamer spacings that minimize the weighted squared error function.

17. A method as defined in claim 16 wherein the spacing of the streamers comprises the crossline offsets between the streamers and the depths of the streamers.

18. A method as defined in claim 16 wherein the actual array response function is a crossline sum of outputs of receivers in the streamers.

19. A method as defined in claim 18 wherein each of the outputs is optimally filtered prior to summation, with the filters determined by a normal equation approach.

20. A method as defined in claim 16 wherein the step of determining the streamer spacings that minimize the weighted squared error function is carried out using a genetic algorithm optimization.

* * * * *